United States Patent
Sugiyama

(10) Patent No.: US 12,465,309 B2
(45) Date of Patent: Nov. 11, 2025

(54) IMAGING SUPPORT DEVICE, AND OPERATION METHOD AND OPERATION PROGRAM FOR THE SAME

(71) Applicant: FUJIFILM CORPORATION, Tokyo (JP)

(72) Inventor: Takeru Sugiyama, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 247 days.

(21) Appl. No.: 17/950,112

(22) Filed: Sep. 22, 2022

(65) Prior Publication Data

US 2023/0015883 A1 Jan. 19, 2023

Related U.S. Application Data

(63) Continuation of application No. PCT/JP2021/009670, filed on Mar. 10, 2021.

(30) Foreign Application Priority Data

Mar. 30, 2020 (JP) ................. 2020-061594

(51) Int. Cl.
*A61B 6/00* (2024.01)
*A61B 6/42* (2024.01)
(Continued)

(52) U.S. Cl.
CPC ............ *A61B 6/461* (2013.01); *A61B 6/4283* (2013.01); *G06T 7/0012* (2013.01)

(58) Field of Classification Search
None
See application file for complete search history.

(56) References Cited

U.S. PATENT DOCUMENTS

2011/0110572 A1 5/2011 Guehring et al.
2013/0121556 A1 5/2013 Matsumoto
(Continued)

FOREIGN PATENT DOCUMENTS

CN 102058432 A 5/2011
CN 108257111 A 7/2018
(Continued)

OTHER PUBLICATIONS

International Search Report issued in International Application No. PCT/JP2021/009670 on May 25, 2021.
(Continued)

*Primary Examiner* — Marcus H Taningco
(74) *Attorney, Agent, or Firm* — SOLARIS Intellectual Property Group, PLLC

(57) ABSTRACT

An imaging support device used in a radiography apparatus including a radiation source and a radiation image detector that detects a radiation image of a subject on the basis of radiation emitted from the radiation source and transmitted through the subject, includes at least one processor. The processor executes a determination process of determining a necessity of and a reason for recapturing an acquired new radiation image by using a trained model that has learned a relationship between a radiation image acquired in the past and the necessity of and the reason for reimaging, a corrective measure derivation process of, in a case where it is determined that reimaging is necessary, deriving a corrective measure for correcting a position or an orientation of the subject on the basis of the reason for determining that reimaging is necessary, and a presentation process of presenting the corrective measure derived in the corrective measure derivation process.

10 Claims, 12 Drawing Sheets

(51) Int. Cl.
*A61B 6/46* (2024.01)
*G06T 7/00* (2017.01)

(56) References Cited

U.S. PATENT DOCUMENTS

| | | | |
|---|---|---|---|
| 2014/0072192 | A1 | 3/2014 | Reiner |
| 2016/0157812 | A1* | 6/2016 | Jung ................. G16H 50/20 378/16 |
| 2017/0178320 | A1* | 6/2017 | Saalbach ............ G06T 7/0012 |
| 2017/0360401 | A1 | 12/2017 | Rothberg et al. |
| 2018/0182102 | A1 | 6/2018 | Jerebko et al. |
| 2018/0232872 | A1 | 8/2018 | Katsumata |
| 2019/0042876 | A1* | 2/2019 | Iijima ................. G06T 7/001 |
| 2019/0150857 | A1 | 5/2019 | Nye et al. |
| 2019/0341150 | A1 | 11/2019 | Mostofi |
| 2019/0354882 | A1* | 11/2019 | Sharma ............... G16H 30/20 |
| 2020/0118274 | A1 | 4/2020 | Saito |
| 2022/0116531 | A1* | 4/2022 | Georgis ............... H04R 1/406 |

FOREIGN PATENT DOCUMENTS

| | | |
|---|---|---|
| CN | 109817304 A | 5/2019 |
| CN | 110831487 A | 2/2020 |
| JP | 2011-255061 A | 12/2011 |
| JP | 2013-102851 A | 5/2013 |
| JP | 2018-130336 A | 8/2018 |
| JP | 2019-521745 A | 8/2019 |
| JP | 2020-025781 A | 2/2020 |

OTHER PUBLICATIONS

Written Opinion of the ISA issued in International Application No. PCT/JP2021/009670 on May 25, 2021.
Extended European Search Report dated Aug. 24, 2023, issued in corresponding EP Patent Application No. 21781598.4.
English language translation of the following: Office action dated Jun. 25, 2024 from the SIPO in a Chinese patent application No. 202180025098.4 corresponding to the instant patent application. This office action translation is submitted now in order to supplement the understanding of the cited references which are being disclosed in the instant Information Disclosure Statement.
English language translation of the following: Office action dated Nov. 18, 2024 from the SIPO in a Chinese patent application No. 202180025098.4 corresponding to the instant patent application.
Office Action dated Jul. 2, 2025, issued by the EPO in corresponding EP Patent Application No. 21781598.4.

* cited by examiner

FIG. 4

| | | |
|---|---|---|
| 37 IMAGING ORDER | ORDER ID | N0001 |
| | SUBJECT ID | H0500 |
| | IMAGING TECHNIQUE | KNEE/BENDING POSTURE/SIDE |

| IMAGING TECHNIQUE | IRRADIATION CONDITIONS |
|---|---|
| KNEE/BENDING POSTURE /SIDE | TUBE VOLTAGE: 50 kV<br>TUBE CURRENT: 150 mA<br>IRRADIATION TIME: 15 ms |
| CHEST/LYING POSTURE /FRONT | TUBE VOLTAGE: 100 kV<br>TUBE CURRENT: 200 mA<br>IRRADIATION TIME: 20 ms |
| CHEST/LYING POSTURE /BACK | TUBE VOLTAGE: 120 kV<br>TUBE CURRENT: 220 mA<br>IRRADIATION TIME: 25 ms |

IMAGING SUPPORT DEVICE, AND OPERATION METHOD AND OPERATION PROGRAM FOR THE SAME

CROSS-REFERENCE TO RELATED APPLICATIONS

This application is a continuation application of International Application No. PCT/JP2021/009670, filed on Mar. 10, 2021, the disclosure of which is incorporated herein by reference in its entirety. Further, this application claims priority from Japanese Patent Application No. 2020-061594, filed on Mar. 30, 2020, the disclosure of which is incorporated herein by reference in its entirety.

BACKGROUND

1. Technical Field

The technique of the present disclosure relates to an imaging support device, and an operation method for the same, and an operation program.

2. Description of the Related Art

In a radiography system used in the medical field, a radiologist or a doctor (hereinafter referred to as a technician or the like) positions an imaging site of a subject in preparation for imaging, and then radiography is performed on the basis of instructions from the technician or the like. However, after positioning an imaging site with respect to an irradiation field of radiation and before radiography is performed, the subject may move to cause a misregistration of an imaging site, and an image of a desired imaging site may not be obtained. As described above, a failure to obtain a desired radiation image through radiography, that is, a failure in radiography is referred to as an "imaging failure". In a case where there is imaging failure, reimaging will be performed. A technician or the like may mistakenly determine that an imaging failure occurs in a radiation image that does not need to be reimaged, and thus unnecessary reimaging may be performed. Reimaging takes time and effort, and an amount of exposure of the subject increases, and the number of times of reimaging is preferably small.

JP2018-130336A and JP2013-102851A disclose a technique for obtaining information regarding the necessity of reimaging by determining a radiation image by using a trained determination device based on machine learning.

SUMMARY

However, the techniques disclosed in JP2018-130336A and JP2013-102851A only provide information regarding the necessity of reimaging, and information regarding positioning of a subject during reimaging cannot be obtained. Therefore, in the techniques disclosed in JP2018-130336A and JP2013-102851A, a technician or the like can determine that reimaging is necessary, but there is no information regarding of positioning of a subject, and thus the same imaging failure may occur again in a case where the subject is reimaged.

The technique of the present disclosure provides an imaging support device, and an operation method for the same, and an operation program capable of supporting positioning of a subject during reimaging.

In order to achieve the above object, according to the present disclosure, there is provided an imaging support device used in a radiography apparatus including a radiation source and a radiation image detector that detects a radiation image of a subject on the basis of radiation emitted from the radiation source and transmitted through the subject, the imaging support device including at least one processor, in which the processor executes a determination process of determining a necessity of and a reason for recapturing an acquired new radiation image by using a trained model that has learned a relationship between a radiation image acquired in the past and the necessity of and the reason for reimaging, a corrective measure derivation process of, in a case where it is determined that reimaging is necessary, deriving a corrective measure for correcting a position or an orientation of the subject on the basis of the reason for determining that reimaging is necessary, and a presentation process of presenting the corrective measure derived in the corrective measure derivation process.

It is preferable that, in the presentation process, the processor displays the corrective measure on a display.

It is preferable that, in the presentation process, in addition to the corrective measure, the processor presents the reason for determining that reimaging is necessary.

It is preferable that the processor displays, on the display, displays a heat map, as the reason, representing a location determined by the trained model as a feature location in the radiation image.

It is preferable that, in the presentation process, the processor enlarges and displays a determination target site in the determination process on the display.

It is preferable that after a radiation image acquired through radiography is displayed on the display, the processor executes the determination process in a case where an instruction for executing the determination process is received via the operation device.

It is preferable that the processor gives a warning in a case where the determination process is performed on a radiation image obtained through radiography and it is determined that reimaging is necessary.

It is preferable that the target site is a region of interest specified on the basis of a feature amount of the radiation image in the determination process.

According to the present disclosure, there is provided an operation method for an imaging support device used in a radiography apparatus including a radiation source and a radiation image detector that detects a radiation image of a subject on the basis of radiation emitted from the radiation source and transmitted through the subject, the operation method preferably including a determination step of determining a necessity of and a reason for recapturing an acquired new radiation image by using a trained model that has learned a relationship between a radiation image acquired in the past and the necessity of and the reason for reimaging; a corrective measure derivation step of, in a case where it is determined that reimaging is necessary, deriving a corrective measure for correcting a position or an orientation of the subject on the basis of the reason for determining that reimaging is necessary; and a presentation step of presenting the corrective measure derived in the corrective measure derivation step.

According to the present disclosure, there is provided an operation program for operating an imaging support device used in a radiography apparatus including a radiation source and a radiation image detector that detects a radiation image of a subject on the basis of radiation emitted from the radiation source and transmitted through the subject and at least one processor, the operation program causing the processor to execute a determination process of determining a necessity of and a reason for recapturing an acquired new radiation image by using a trained model that has learned a relationship between a radiation image acquired in the past and the necessity of and the reason for reimaging; a corrective measure derivation process of, in a case where it is determined that reimaging is necessary, deriving a corrective measure for correcting a position or an orientation of the subject on the basis of the reason for determining that reimaging is necessary; and a presentation process of presenting the corrective measure derived in the corrective measure derivation process.

According to the technique of the present disclosure, it is possible to provide an imaging support device, and an operation method for the same, and an operation program capable of supporting positioning of a subject at the time of reimaging.

BRIEF DESCRIPTION OF THE DRAWINGS

Exemplary embodiments according to the technique of the present disclosure will be described in detail based on the following figures, wherein:

FIG. 4 is a diagram exemplifying an imaging order,

FIG. 5 is a diagram exemplifying a condition table,

DETAILED DESCRIPTION

Figure 1:
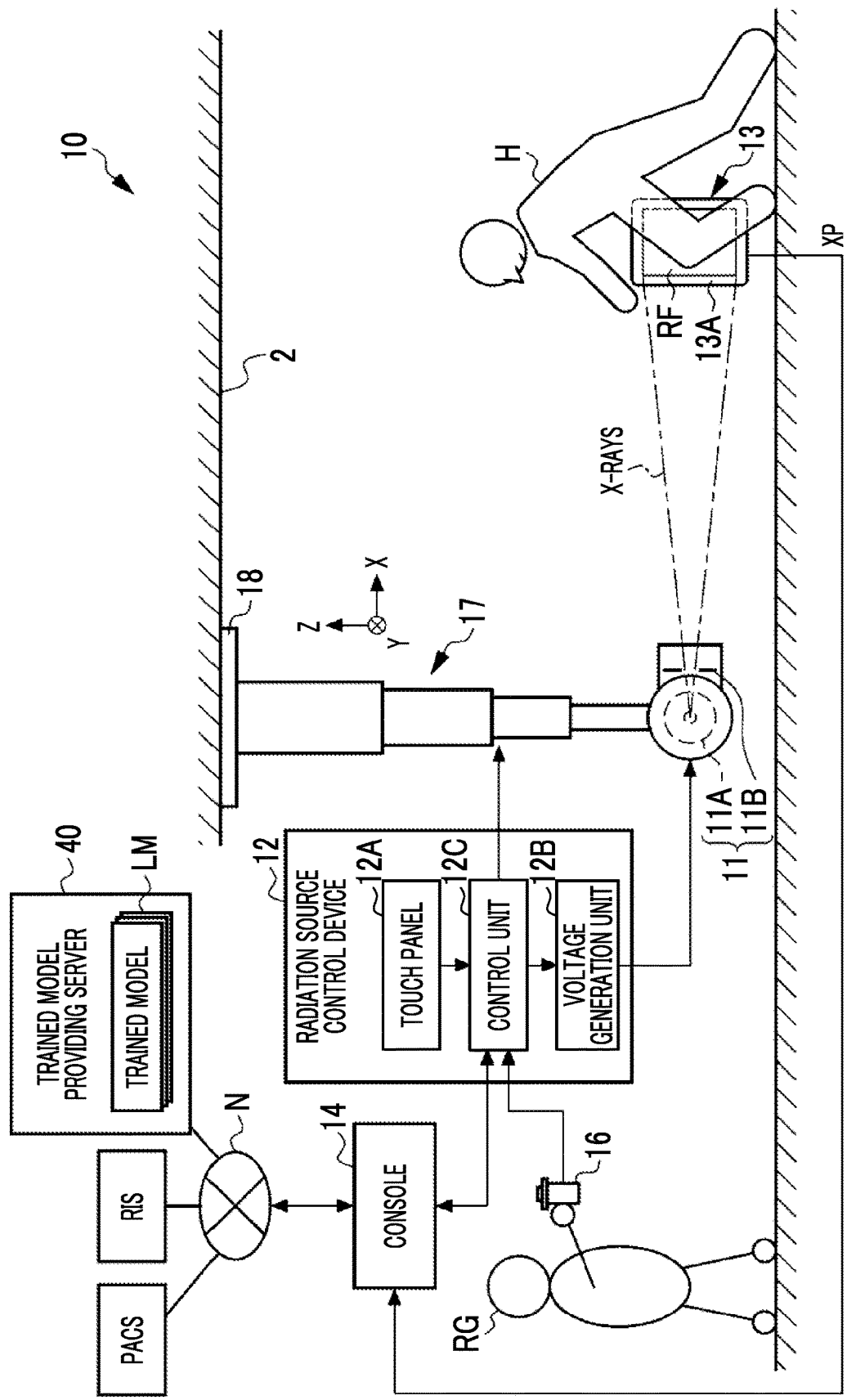
FIG. 1 is a diagram showing a configuration of an X-ray imaging system.

In FIG. 1, an X-ray imaging system 10 that uses X-rays as radiation includes an X-ray source 11, a radiation source control device 12, an electronic cassette 13, and a console 14. In the present embodiment, an imaging support device is configured by the console 14. The X-ray source 11 is an example of a radiation source. The electronic cassette 13 is an example of a radiation image detector.

In the X-ray imaging system 10, the electronic cassette 13 is disposed at a position facing the X-ray source 11. By disposing a subject H between the X-ray source 11 and the electronic cassette 13, it is possible to capture an X-ray image of an imaging site (knee in FIG. 1) of the subject H. The X-ray source 11 and the electronic cassette 13 configure an X-ray imaging apparatus. This X-ray imaging apparatus is an example of a radiography apparatus.

The electronic cassette 13 may be disposed by using an imaging table. In the present embodiment, it is assumed that a radiologist (hereinafter, simply referred to as a technician) RG positions the subject H, and then the technician RG performs an X-ray imaging operation.

The X-ray source 11 includes an X-ray tube 11A that generates X-rays and an irradiation field limiter 11B that limits an irradiation field RF that is a region irradiated with X-rays. The X-ray source 11 may include an irradiation field display light source (not shown) that emits irradiation field display light indicating the irradiation field RF on an X-ray incident surface 13A of the electronic cassette 13.

The X-ray tube 11A has a filament that emits thermions and a target that collides with the thermions emitted from the filament and emits X-rays. In the irradiation field limiter 11B, for example, by disposing four lead plates that shield X-rays on respective quadrangular sides, a quadrangular irradiation opening for transmitting X-rays is formed at the center. In this case, the irradiation field limiter 11B changes a size of the irradiation opening by moving positions of the lead plates, and sets the irradiation field RF.

The radiation source control device 12 has a touch panel 12A, a voltage generation unit 12B, and a control unit 12C. The touch panel 12A is operated by the technician RG in a case where X-rays irradiation conditions and a size of the irradiation opening of the irradiation field limiter 11B are set. The X-ray irradiation conditions include a tube voltage and a tube current applied to the X-ray source 11, and the X-ray irradiation time.

The voltage generation unit 12B generates a tube voltage applied to the X-ray tube 11A. By controlling an operation of the voltage generation unit 12B, the control unit 12C sets the tube voltage, the tube current, and the X-ray irradiation time to values set by using the touch panel 12A. The control unit 12C has a timer that starts clocking in a case where X-rays are generated from the X-ray tube 11A. The control unit 12C stops the operation of the X-ray tube 11A, for example, when the time measured by the timer reaches the irradiation time defined in the irradiation conditions. The control unit 12C operates the irradiation field limiter 11B, and sets the size of the irradiation opening to a size set by using the touch panel 12A.

An irradiation switch 16 is connected to the control unit 12C via a cable or the like. The irradiation switch 16 is operated by the technician RG in a case where irradiation of X-rays is started. In a case where the irradiation switch 16 is operated, the radiation source control device 12 generates X-rays in the X-ray tube 11A. Consequently, X-rays are applied toward the irradiation field RF.

The electronic cassette 13 detects an X-ray image XP based on X-rays emitted from the X-ray source 11 and transmitted through the imaging site of the subject H. The electronic cassette 13 has a wireless communication unit and a battery, and performs an operation wirelessly. The electronic cassette 13 wirelessly transmits the detected X-ray image XP to the console 14. The X-ray image XP is an example of a radiation image.

The X-ray source 11 is suspended vertically downward from a ceiling 2 of an imaging room. The X-ray source 11 is held by a suspension holding mechanism 17. The suspension holding mechanism 17 is attached to the ceiling 2 via a horizontal movement mechanism 18. The suspension holding mechanism 17 holds the X-ray source 11 in a vertical direction (±Z direction) to be able to be moved up and down. The horizontal movement mechanism 18 movably holds the suspension holding mechanism 17 in an X-ray irradiation axis direction (±X direction) and a direction (±Y direction) orthogonal to the X-ray irradiation axis direction of the X-ray source 11.

A motor (not shown) is provided in each of the suspension holding mechanism 17 and the horizontal movement mechanism 18, and it is possible to move the X-ray source 11 manually or electrically in each direction. Operations of the suspension holding mechanism 17 and the horizontal movement mechanism 18 are controlled by the control unit 12C. Whether to move the X-ray source 11 manually or electrically may be selected by using the touch panel 12A. By moving the X-ray source 11, a position of the irradiation field RF can be adjusted.

The console 14 is connected to a radiology information system (RIS) and a picture archiving and communication system (PACS) provided in the X-ray imaging system 10 via the network N. The console 14 has a function of performing X-ray imaging through an operation of the technician RG on the basis of the imaging order and various information acquired from the RIS. The console 14 has a function of outputting the X-ray image XP received from the electronic cassette 13 to the PACS after the X-ray imaging.

For example, the console 14 is installed in an operation room adjacent to the imaging room in which the X-ray source 11 is installed. The X-ray image XP received by the console 14 from the electronic cassette 13 is displayed on the display 30 (refer to FIG. 3) provided on the console 14. The technician RG can determine whether or not the X-ray image XP is an image suitable for diagnosis on the basis of the X-ray image XP displayed on the display 30.

The console 14 is connected to a trained model providing server 40 via the network N. The trained model providing server 40 stores a trained model LM that has learned a relationship between the X-ray image XP acquired in the past and the necessity of and reason for reimaging through machine learning. The console 14 uses the trained model LM provided by the trained model providing server 40 to determine the necessity of reimaging the new X-ray image XP received from the electronic cassette 13.

A plurality of learned trained models LM are stored in the trained model providing server 40. For example, each of the plurality of trained models LM is associated with an imaging technique. The imaging technique is information regarding an imaging site of the subject H and a posture and an orientation of the imaging site. For example, the trained model LM is a model generated by performing machine learning by using a plurality of X-ray image XPs stored in the PACS and captured according to the same imaging technique. Machine learning for generating the trained model LM is performed, for example, on the trained model providing server 40.

Figure 2:
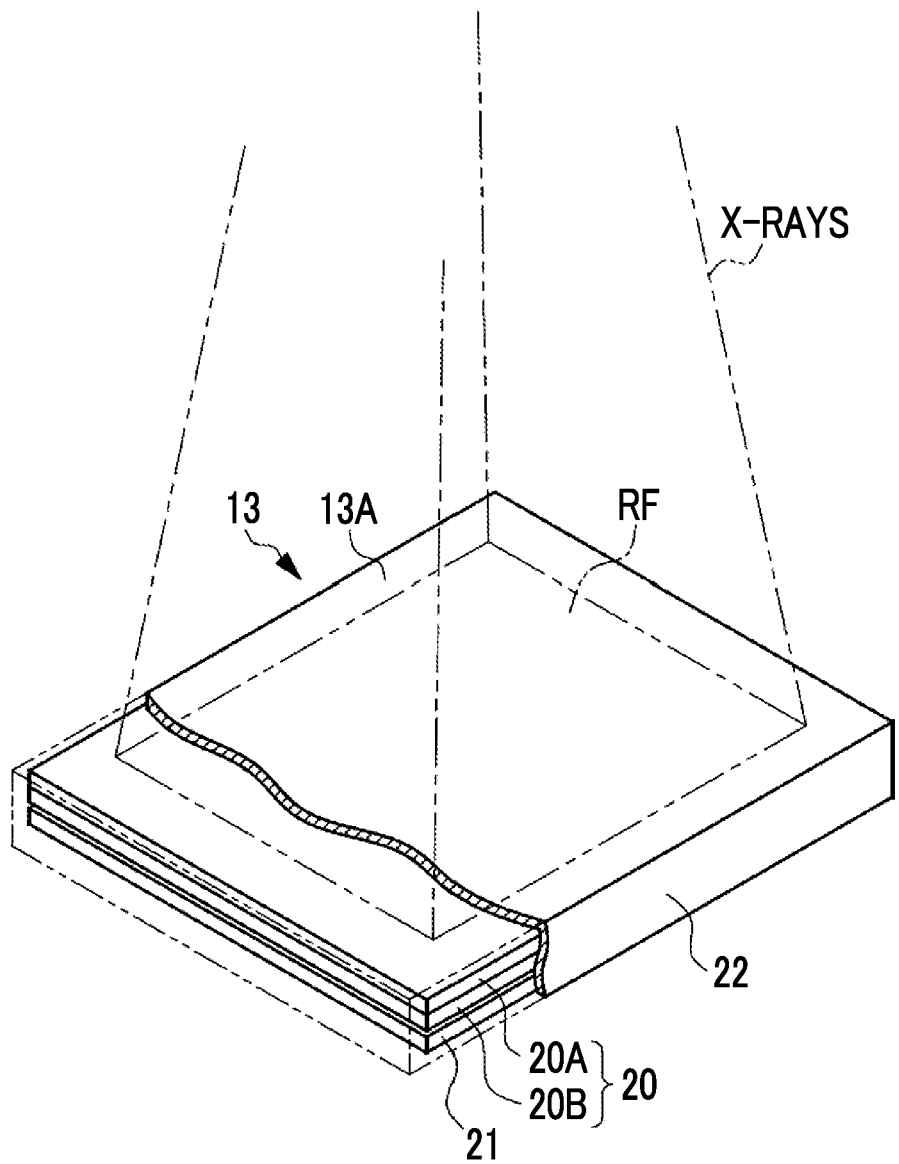
FIG. 2 is an external perspective view of an electronic cassette.

In FIG. 2, the electronic cassette 13 includes a sensor panel 20, a circuit unit 21, and a rectangular parallelepiped-shaped portable casing 22 that accommodates the sensor panel 20 and the circuit unit 21. The casing 22 has a size conforming to the international standard International Organization for Standardization (ISO) 4090:2001, which is substantially the same as that of, for example, a film cassette, an imaging plate (IP) cassette, or a computed radiography (CR) cassette.

The electronic cassette 13 is positioned in a posture in which the X-ray incident surface 13A that is an upper surface of the casing 22 faces the X-ray source 11, and the X-ray incident surface 13A is irradiated with X-rays. Although not shown, the casing 22 is also provided with a switch for switching between turning-on and turning-off of a main power source, and an indicator for reporting an operation state of the electronic cassette 13 such as a remaining battery usage time or an imaging ready state.

The sensor panel 20 is configured with a scintillator 20A and a light detection substrate 20B. The scintillator 20A and the light detection substrate 20B are laminated in the order of the scintillator 20A and the light detection substrate 20B when viewed from the X-ray incident surface 13A side. The scintillator 20A has phosphors such as CsI:Tl (thallium-activated cesium iodide) or GOS ($Gd_2O_2S$:Tb, terbium-activated gadolinium oxysulfide), and converts X-rays incident via the X-ray incident surface 13A into visible light and emits the visible light. A sensor panel in which the light detection substrate 20B and the scintillator 20A are laminated in this order when viewed from the X-ray incident surface 13A side may be used. A direct conversion type sensor panel that directly converts X-rays into signal charge with a photoconductor such as amorphous selenium may be used.

The light detection substrate 20B detects the visible light emitted from the scintillator 20A and converts the visible light into electric charge. The circuit unit 21 controls the drive of the light detection substrate 20B and generates the X-ray image XP on the basis of the electric charge output from the light detection substrate 20B.

A plurality of pixels are arranged in a two-dimensional matrix on the light detection substrate 20B. Each pixel photoelectrically converts the visible light emitted by the scintillator 20A to generate and store electric charge. The X-ray image XP is generated by converting the electric charge stored in each pixel into a digital signal in the circuit unit 21.

The electronic cassette 13 has a function of detecting, for example, the start of X-ray irradiation. This irradiation start detection function is realized by, for example, an irradiation start detection sensor provided on the light detection substrate 20B. The irradiation start detection sensor is configured with, for example, some of a plurality of pixels disposed in a two-dimensional matrix. In a case where a dose signal periodically output from the irradiation start detection sensor exceeds a threshold value, it is determined that the X-ray irradiation has started.

The electronic cassette 13 has a timer that starts clocking when the start of X-ray irradiation is detected, in the same manner as the radiation source control device 12. The electronic cassette 13 determines that the X-ray irradiation is finished when the time measured by the timer reaches the irradiation time included in the irradiation conditions set for the console 14. Consequently, the electronic cassette 13 can detect the X-ray image XP based on the applied X-ray by performing the X-ray detection operation only for a period corresponding to the irradiation time included in the irradiation conditions.

The electronic cassette 13 has an image memory and a wireless communication circuit. The electronic cassette 13 stores the X-ray image XP generated by the circuit unit 21 in the image memory, and transmits the X-ray image XP stored in the image memory to the console 14 with the wireless communication circuit.

Figure 3:
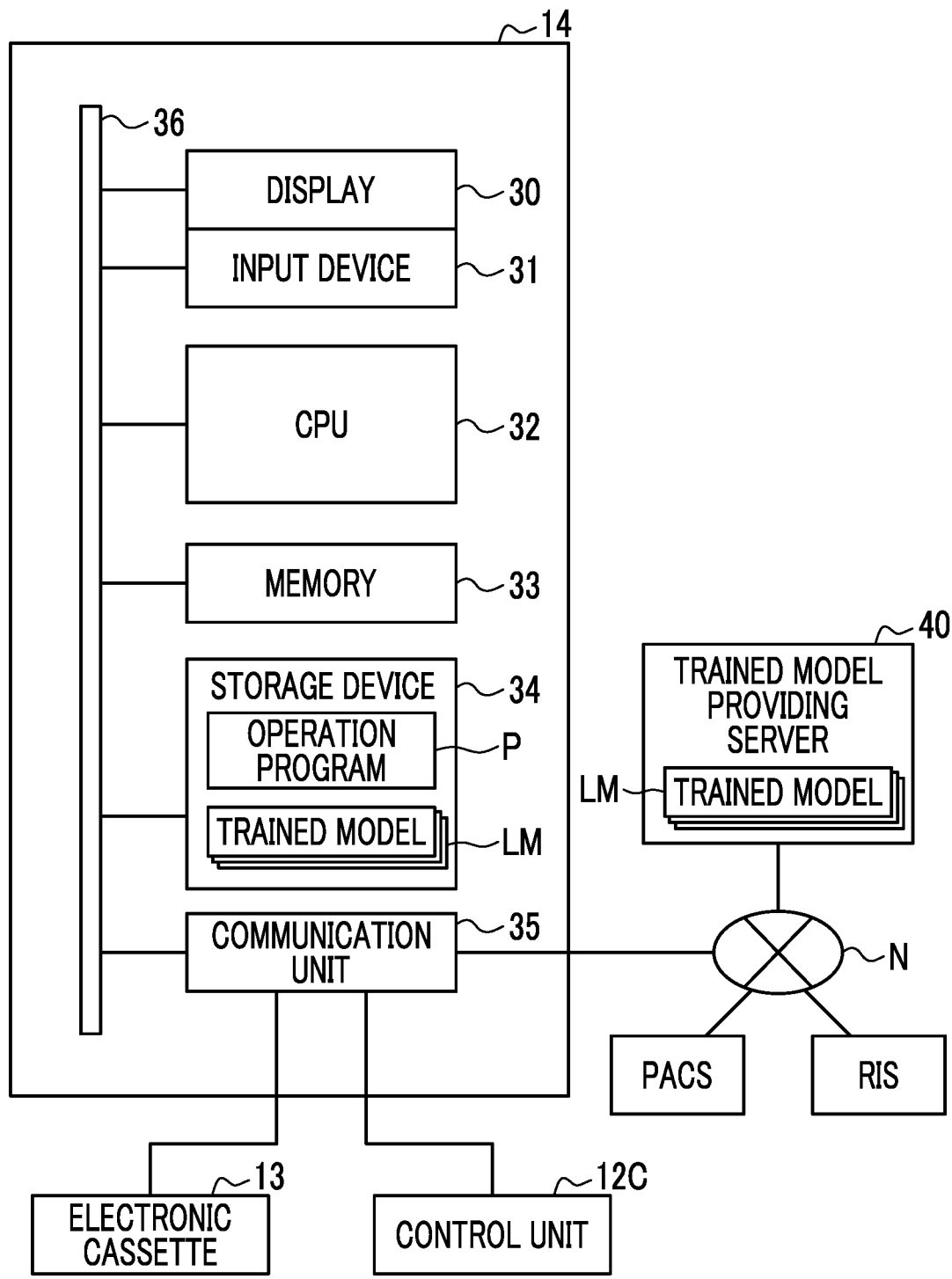
FIG. 3 is a block diagram showing a configuration of a console.

In FIG. 3, the console 14 includes a display 30, an input device 31, a central processing unit (CPU) 32, a storage device 34, a memory 33, and a communication unit 35. These constituents are connected to each other via a data bus 36.

The display 30 is a display device that displays various operation screens provided with operation functions by a graphical user interface (GUI) and the X-ray image XP. The input device 31 is an input operation device including a touch panel, a keyboard, and the like.

The storage device 34 is, for example, a hard disk drive (HDD) array, which is built in the console 14 or externally connected to the console 14. The storage device 34 stores control programs such as an operating system, various application programs, and various types of data associated with these programs.

The storage device 34 stores an operation program P for operating the console 14 as an imaging support device, and the plurality of trained models LM provided by the trained model providing server 40. The storage device 34 stores a condition table 38 that will be described later, and the X-ray image XP received from the electronic cassette 13.

The memory 33 is a work memory for the CPU 32 to execute a process. The CPU 32 collectively controls each unit of the console 14 by loading the program stored in the storage device 34 to the memory 33 and executing processes according to the program. The communication unit 35 transmits and receives various types of data such as the X-ray image XP to and from the electronic cassette 13. The communication unit 35 communicates with the control unit 12C of the radiation source control device 12. The communication unit 35 communicates with the RIS, the PACS, and the trained model providing server 40 via the network N.

The console 14 receives input of an imaging order 37 shown in FIG. 4. The imaging order 37 is information for instructing the technician RG to perform X-ray imaging, for example, from an imaging requester in a clinical department. The imaging order 37 is delivered from the RIS to the console 14, for example.

The imaging order 37 has items such as an order identification data (ID), a subject ID, and an imaging technique. The order ID is a symbol or number that identifies each imaging order 37, and is automatically assigned by the RIS. In the item of subject ID, a subject ID of the subject H who is an imaging target is written. The subject ID is a symbol or a number that identifies each subject H.

As described above, the imaging technique is information regarding an imaging site of the subject H and a posture and an orientation of the imaging site. In addition to the knees exemplified in FIG. 1, the imaging site includes the head, the cervical spine, the chest, the abdomen, hands, fingers, elbows, and the like. The posture is a posture of the subject H such as a standing posture, a lying posture, or a sitting posture. The orientation is an orientation of the subject H with respect to the X-ray source 11, such as the front, the side, or the back. In addition to these items, the imaging order 37 includes items of subject information such as the name, gender, age, height, and weight of the subject H.

The condition table 38 shown in FIG. 5 is stored in the storage device 34 of the console 14. Irradiation conditions corresponding to each imaging technique are associated and registered in the condition table 38.

The console 14 displays an imaging order list that lists the details of the imaging order 37 shown in FIG. 4 on the display 30 through an operation of the technician RG. The technician RG may view the imaging order list and check the details of the imaging order 37. The console 14 displays the details of the condition table 38 shown in FIG. 5 on the display 30. The technician RG may select and set irradiation conditions that match the imaging technique designated in the imaging order 37.

The console 14 wirelessly transmits condition setting signals including various types of information such as irradiation conditions set by the technician RG, an order ID, and a console ID as console identification information to the electronic cassette 13.

The console 14 stores the X-ray image XP received from the electronic cassette 13 in the storage device 34 that is a storage unit, for example, as an image file in a format conforming to the Digital Imaging and Communication in Medicine (DICOM) standard. In the image file, the X-ray image XP and accessory information are associated with each other by one image ID. The accessory information includes an order ID, a subject ID, an imaging technique, irradiation conditions, and the like.

In a case where the imaging technique is "knee/bending posture/side", a doctor makes a diagnosis of the joint cavity JC (refer to FIG. 7) of the knee on the basis of the X-ray image XP. Thus, at the time of X-ray imaging, it is necessary that an imaging site of the subject H is accurately positioned such that the joint cavity JC is clearly depicted in the X-ray image XP. For example, in a case where the knee of the subject H is in an appropriate position and orientation with respect to the X-ray incident surface 13A of the electronic cassette 13, the X-ray image XP in which the visibility of the joint cavity JC is favorable and that is suitable for diagnosis has good may be obtained. In contrast, for example, in a case where the knee of the subject H turns outward or inward, the X-ray image XP unsuitable for diagnosis in which the visibility of the joint cavity JC is low may be obtained.

Figure 6:
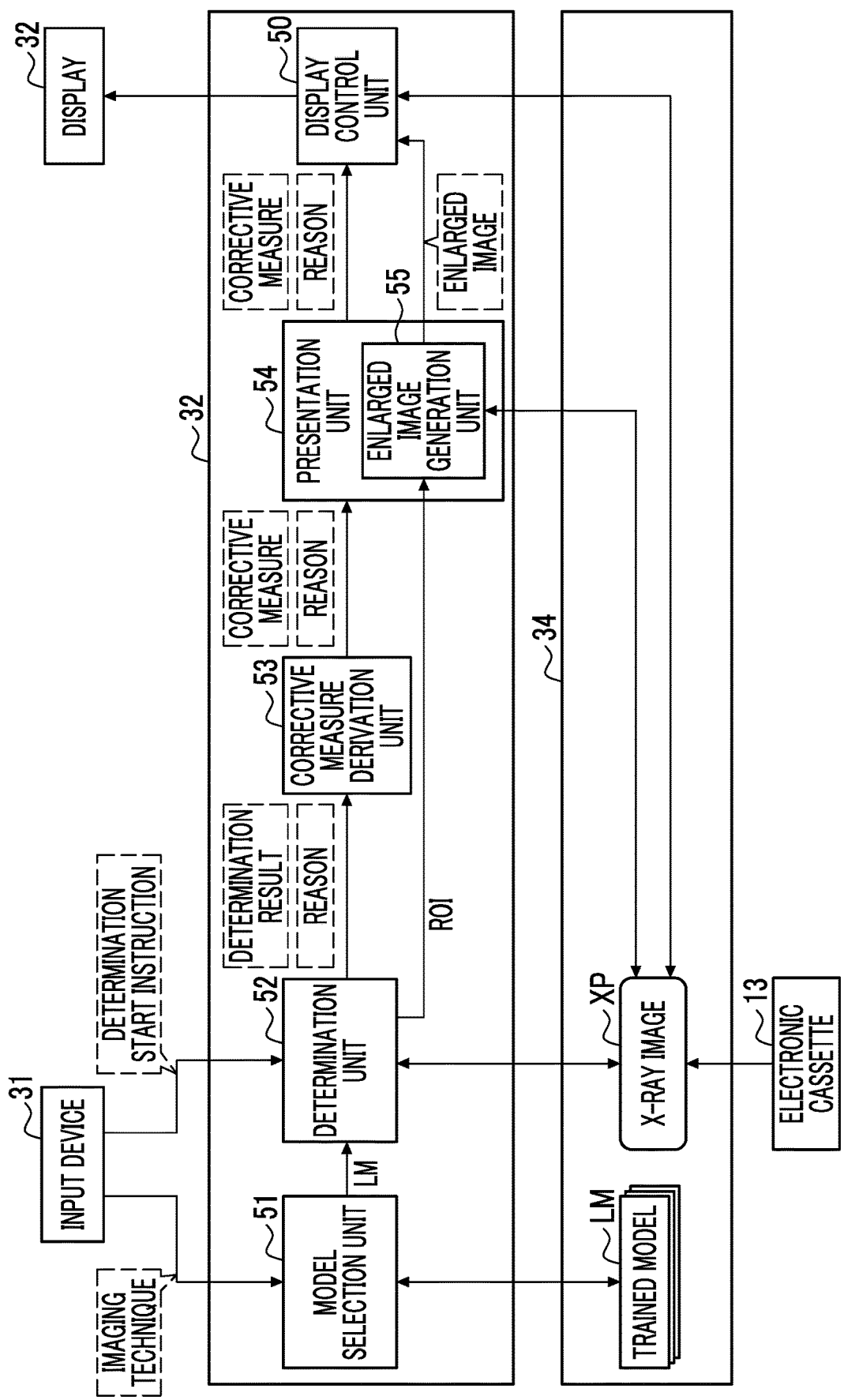
FIG. 6 is a block diagram showing each functional unit configured in a CPU.

FIG. 6 shows a functional unit realized by the CPU 32 executing an operation on the basis of the operation program P. The operation program P causes the CPU 32 to function as a display control unit 50, a model selection unit 51, a determination unit 52, a corrective measure derivation unit 53, and a presentation unit 54.

The display control unit 50 displays, on the display 30, a console screen that allows the technician RG to perform various operations such as selection of the imaging order 37 by using the input device 31. The display control unit 50 displays the X-ray image XP stored in the storage device 34 in the console screen.

The model selection unit 51 selects the trained model LM corresponding to the imaging technique included in the imaging order 37 selected by the technician RG by using the input device 31 from among the plurality of trained models LM stored in the storage device 34. The model selection unit 51 supplies the selected trained model LM to the determination unit 52.

The determination unit 52 performs a determination process in a case where, for example, a determination start command signal input to the CPU 32 is received in a case where a determination start instruction is given by the technician RG by using the input device 31. The determination unit 52 determines whether or not the X-ray image XP stored in the storage device 34 is suitable for diagnosis, that is, whether or not reimaging is necessary, by using the trained model LM supplied from the model selection unit 51.

The trained model LM is configured by using a neural network. The trained model LM is configured by using, for example, a deep neural network (DNN), which is a multi-layer neural network that is a target of deep learning. As the DNN, for example, a convolutional neural network (CNN) for an image is used.

After performing the determination process, the determination unit 52 supplies a "determination result" indicating the necessity of reimaging and a "reason" for determining that reimaging is necessary in a case where it is determined that reimaging is necessary to the corrective measure derivation unit 53. Hereinafter, the reason for determining that reimaging is necessary will be referred to as a "reason for reimaging". As described above, in a case where the knee is used as an imaging site, "outward turning" or "inward turning" is a reason for reimaging. The determination unit 52 may generate a more detailed reason for reimaging.

In a case where the determination unit 52 determines that reimaging is necessary, the corrective measure derivation unit 53 performs a corrective measure derivation process on the basis of the reason for reimaging. For example, the corrective measure derivation unit 53 derives a corrective measure that "it is better to turn outward" in a case where the reason for reimaging is "inward turning", and conversely, derives a corrective measure that "it is better to turn outward" in a case where the reason for reimaging is "inward turning". The corrective measure derivation unit 53 may derive a more detailed corrective measure.

The corrective measure derivation unit 53 derives a corrective measure on the basis of a table listing corrective measures corresponding to the reason for reimaging, for example. The corrective measure derivation unit 53 may create a sentence that is configured by a trained model and expresses a corrective measure corresponding to a reason for reimaging by using the trained model.

The presentation unit 54 performs a presentation process of supplying the corrective measure derived by the corrective measure derivation unit 53 together with the reason for reimaging to the display control unit 50 to be displayed on the console screen of the display 30.

The presentation unit 54 has an enlarged image generation unit 55 that enlarges and displays a determination target site in the determination process. The enlarged image generation unit 55 performs an enlargement process of extracting and enlarging, from the X-ray image XP, a region corresponding to a region of interest ROI (refer to FIG. 7) that the determination unit 52 paid attention to during the determination process. The enlarged image generation unit 55 supplies the enlarged image created by the enlargement processing to the display control unit 50, so that the enlarged image is displayed on the console screen of the display 30.

Figure 7:
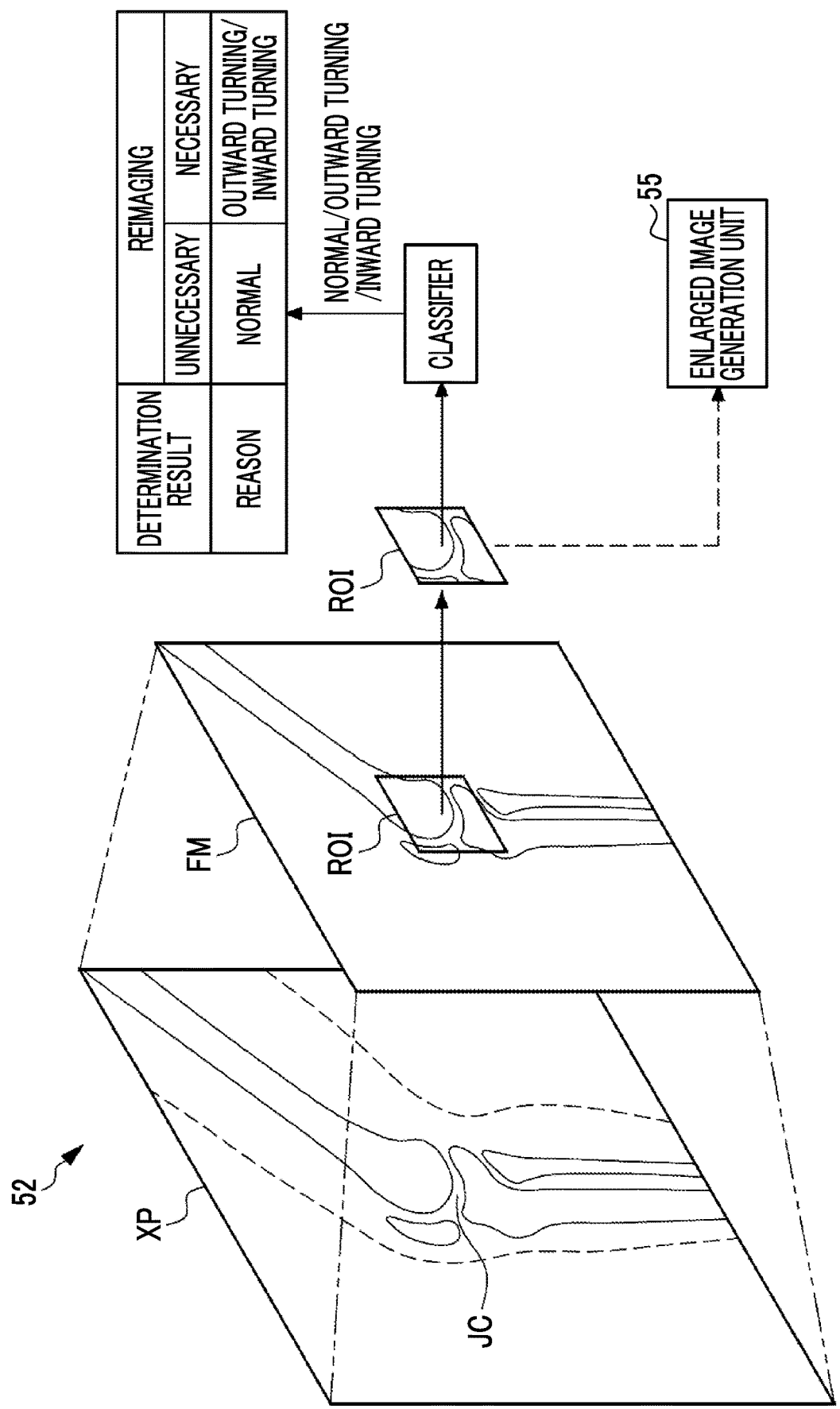
FIG. 7 is a diagram showing an outline of a determination process.

FIG. 7 shows an outline of the determination process performed by the determination unit 52. As shown in FIG. 7, for example, the determination unit 52 uses the X-ray image XP as an input image and generates a feature map FM representing a feature amount of the image by a convolution layer (not shown). The determination unit 52 sets a specific region as the region of interest ROI by calculating a feature amount of each region in the feature map FM. The determination unit 52 cuts out the region of interest ROI from the feature map FM and inputs the region of interest ROI to a classifier. The determination unit 52 supplies information regarding the region of interest ROI to the enlarged image generation unit 55 described above.

The classifier classifies an image on the basis of an input feature amount of the region of interest ROI. The classifier classifies the image of the region of interest ROI into three types, for example, "normal", "outward turning", and "inward turning". In this case, the determination unit 52 determines that reimaging is not necessary in a case where the image of the region of interest ROI is "normal". In a case where the image of the region of interest ROI is "outward turning" or "inward turning", the determination unit 52 determines that reimaging is necessary. In a case where it is determined that reimaging is necessary, the determination unit 52 specifies a reason for reimaging from either "outward turning" or "inward turning".

Figure 8:
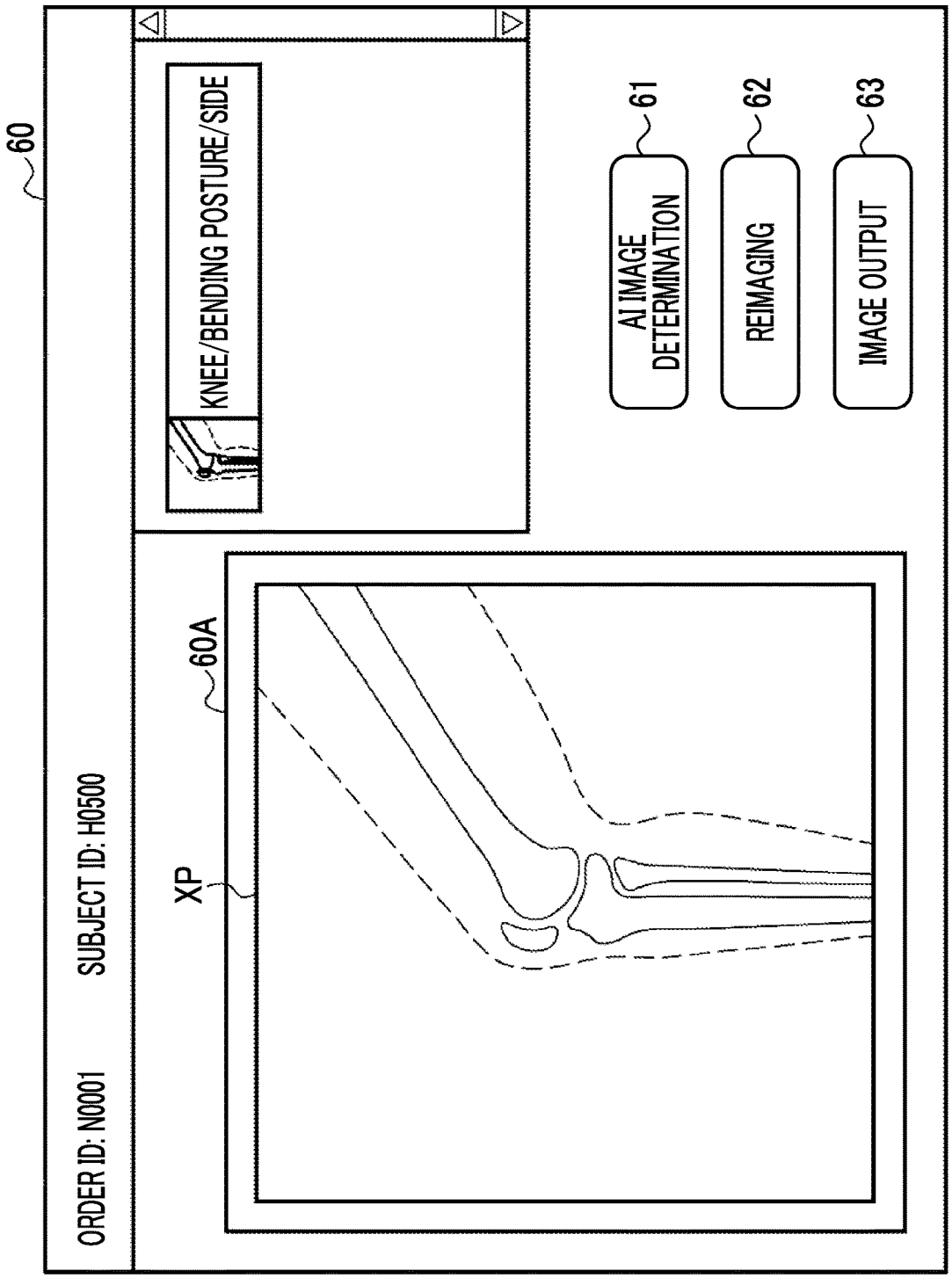
FIG. 8 is a diagram showing an example of a console screen.

FIG. 8 shows an example of a console screen displayed on the display 30 by the display control unit 50. As shown in FIG. 8, a console screen 60 is provided with an image display region 60A for displaying the X-ray image XP.

On the console screen 60, a first operation button 61 for performing artificial intelligence (AI) determination, a second operation button 62 for performing reimaging, and a third operation button 63 for outputting the X-ray image XP to the outside. The first operation button 61, the second operation button 62, and the third operation button 63 configure an input device 31 and are operated by a touch panel formed on the screen of the di splay 30.

The AI image determination refers to the determination process by the determination unit 52. The first operation button 61 is pressed in a case where the technician RG checks the X-ray image XP displayed in the image display region 60A and is wondering whether or not it is necessary to perform reimaging. By pressing the first operation button 61, the technician RG can give an instruction (hereinafter, referred to as an AI image determination instruction) for the determination process being executed by the determination unit 52. In a case where the first operation button 61 is pressed, a determination start command signal is output from the input device 31.

The second operation button 62 is pressed in a case where the technician RG checks the X-ray image XP displayed in the image display region 60A a corrective measure presented by the presentation unit 54, or the like, and determines that it is necessary to perform reimaging. In a case where the second operation button 62 is pressed, the X-ray image XP can be recaptured by operating the irradiation switch 16.

The third operation button 63 is pressed in a case where the technician RG checks the X-ray image XP displayed in the image display region 60A and determines that it is not necessary to perform reimaging. In a case where the third operation button 63 is pressed, the X-ray image XP is output to the PACS or the like.

Figure 9:
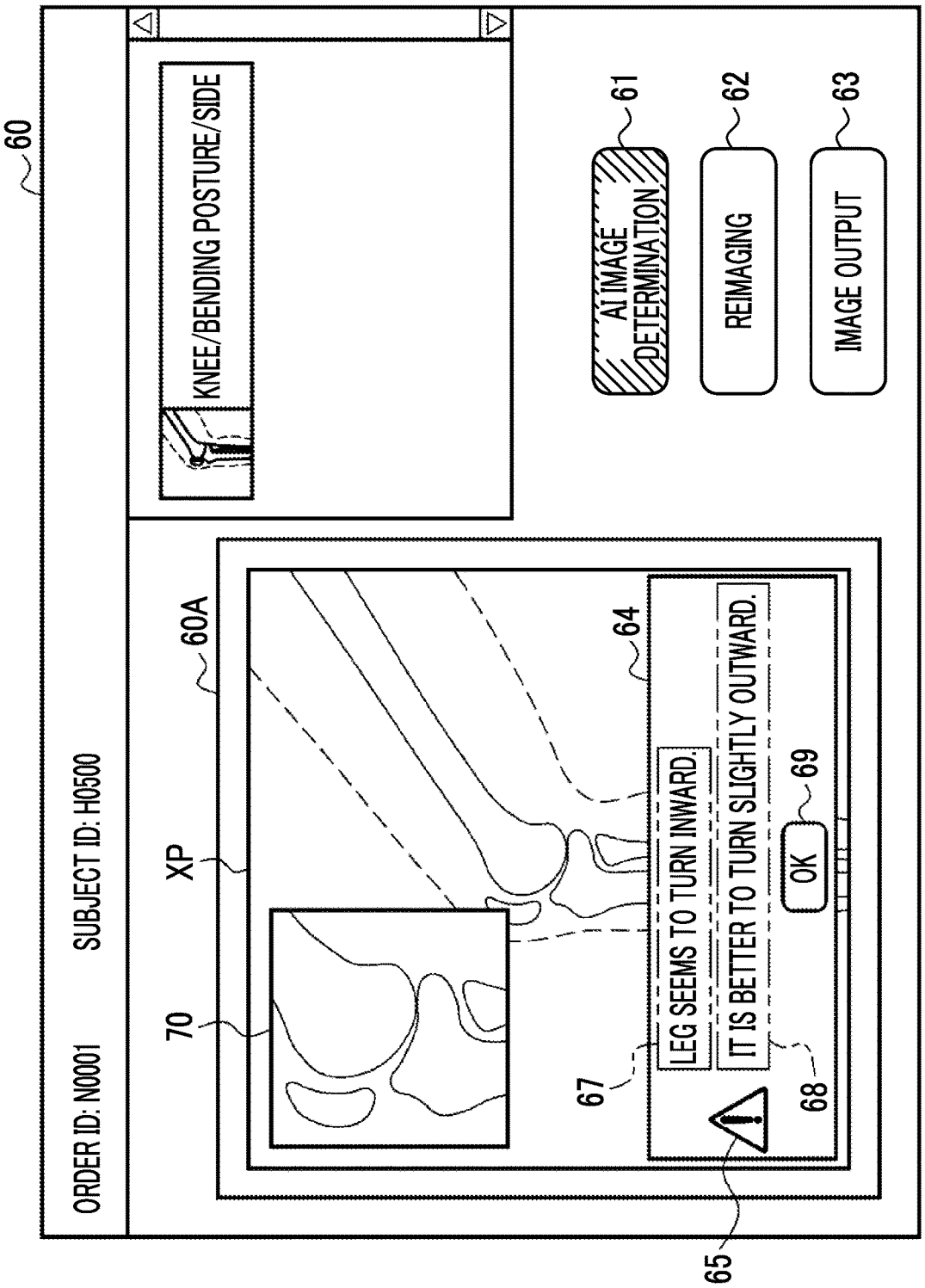
FIG. 9 is a diagram showing a display example of a console screen in a case where it is determined that reimaging is necessary.

FIG. 9 shows a display example of the console screen 60 in a case where it is determined that reimaging is necessary as a result of performing the determination process by the determination unit 52. A message box 64 indicating a determination result or the like from the determination unit 52 is displayed in the image display region 60A.

In the example shown in FIG. 9, in the message box 64, a warning mark 65 indicating that the determination result is not good and reimaging is necessary is displayed. In the message box 64, a reason for reimaging 67 determined by the determination unit 52 and a corrective measure 68 derived by the corrective measure derivation unit 53 are displayed. An OK button 69 that is operated in a case where the message box 64 is closed is displayed in the message box 64.

In the image display region 60A, an enlarged image 70 of the region of interest ROI generated by the enlarged image generation unit 55 is displayed. By checking the enlarged image 70, the technician RG can more accurately determine whether or not reimaging is necessary even though the determination unit 52 performs an erroneous determination.

Figure 10:
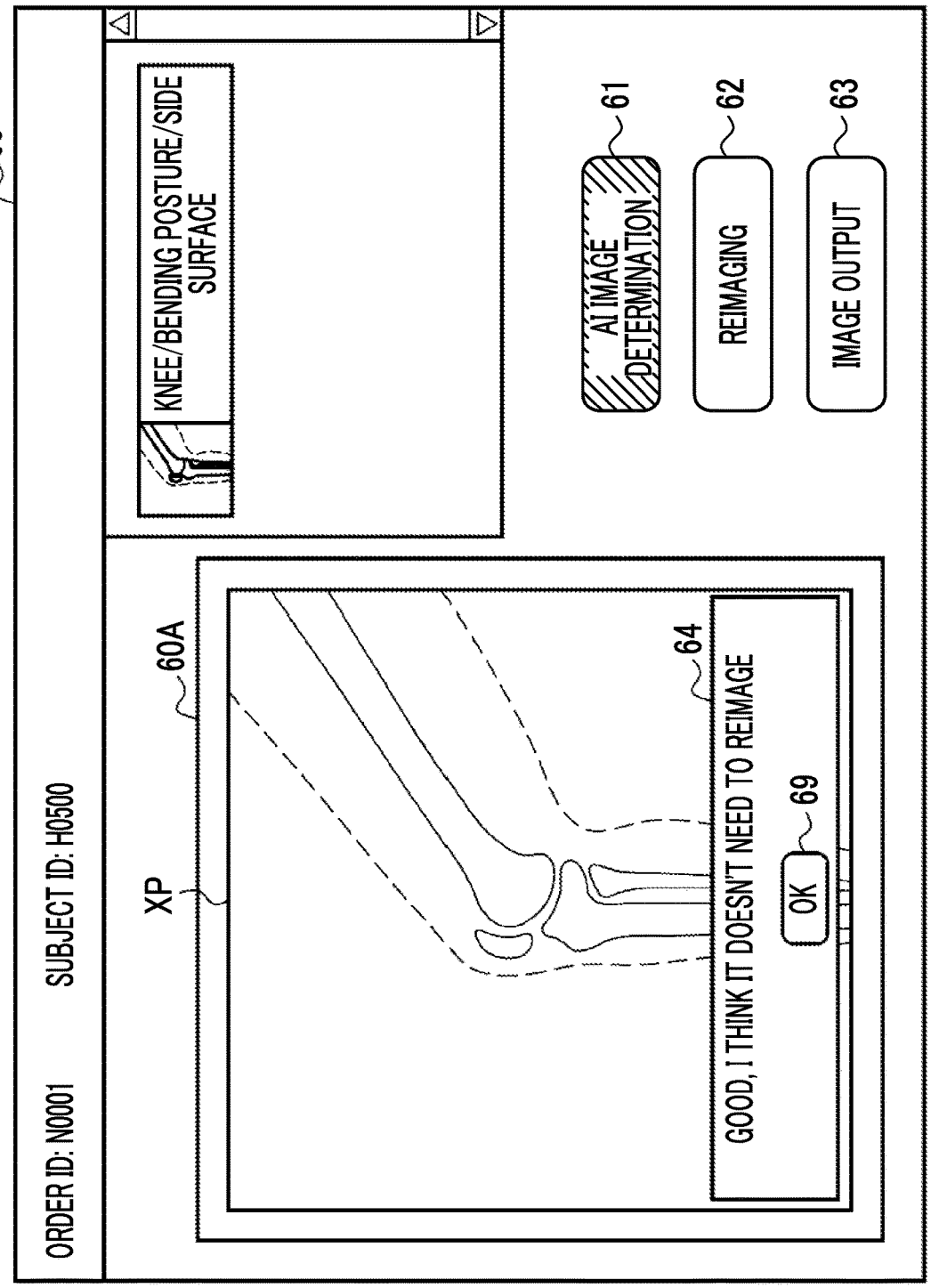
FIG. 10 is a diagram showing a display example of a console screen in a case where it is determined that reimaging is unnecessary.

FIG. 10 shows a display example of the console screen 60 in a case where it is determined that reimaging is unnecessary as a result of the determination unit 52 performing the determination process.

In the example shown in FIG. 10, a message indicating that the determination result is good and reimaging is unnecessary is displayed in the message box 64. In the same manner as in the example shown in FIG. 9, the OK button 69 is displayed in the message box 64.

Figure 11:
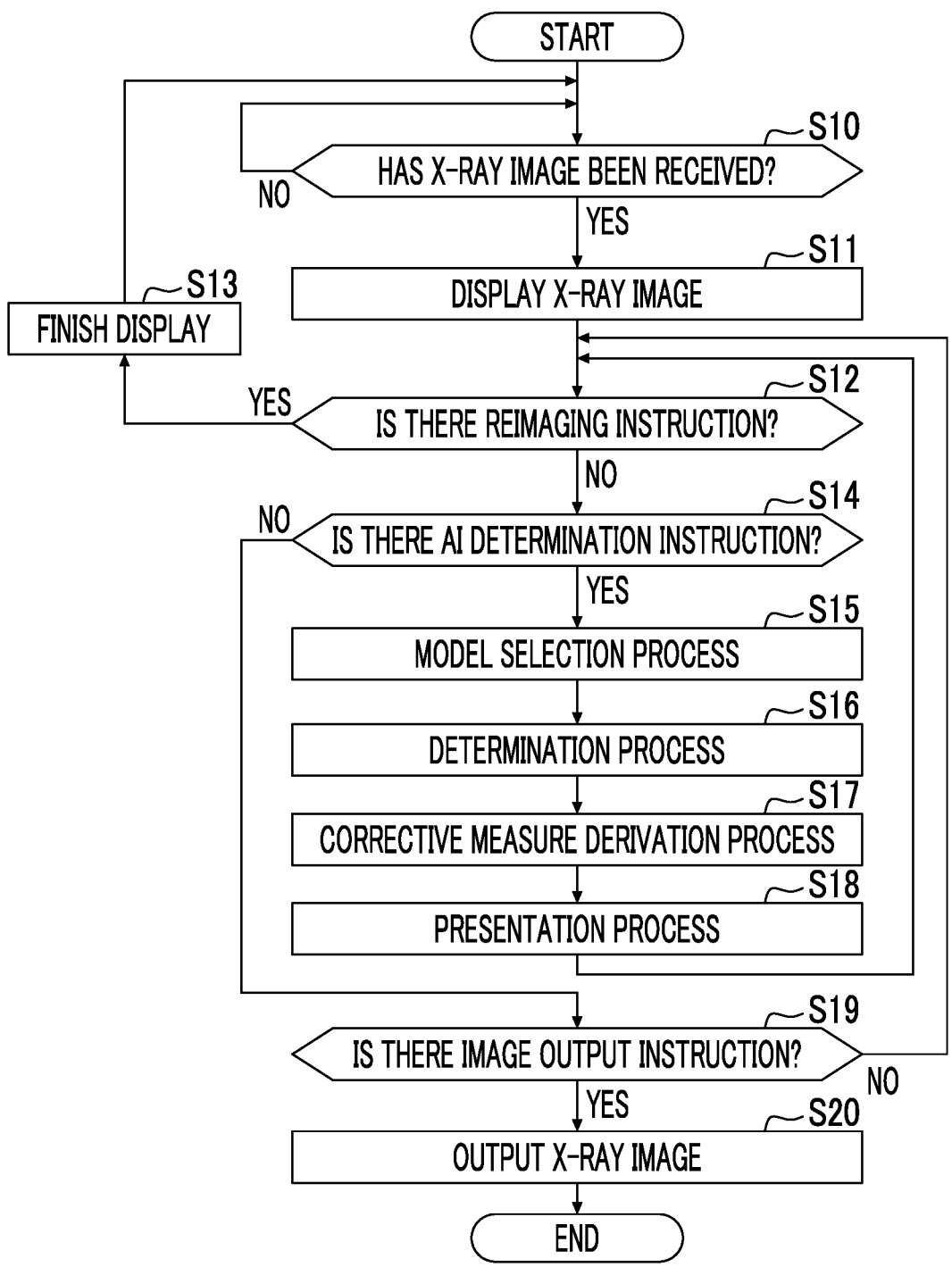
FIG. 11 is a flowchart showing an example of a processing procedure of an imaging support device.

Next, an operation of the imaging support device configured by the console 14 as described above will be described with reference to the flowchart of FIG. 11. First, prior to imaging, the technician RG checks details of the imaging order 37 acquired by the console 14 from the RIS on the display 30, and sets irradiation conditions by using the input device 31 and the touch panel 12A.

Next, the technician RG positions the X-ray source 11, the electronic cassette 13, and the subject H according to an imaging technique included in the imaging order 37. Here, the imaging technique is "knee/bending posture/side". The technician RG bends one leg of the subject H and positions the subject H such that the side of the knee faces the X-ray incident surface 13A of the electronic cassette 13 and the knee is located at the center of the irradiation field RF (refer to FIG. 1).

The CPU 32 of the console 14 determines whether or not the X-ray image XP transmitted from the electronic cassette 13 has been received as a result of the X-ray imaging performed by the technician RG operating the irradiation switch 16 (step S10). In a case where the X-ray image XP has been received from the electronic cassette 13, the CPU 32 stores the X-ray image XP in the storage device 34 and displays the X-ray image XP in the image display region 60A of the console screen 60 (step S11). The technician RG refers to the X-ray image XP (refer to FIG. 8) displayed in the image display region 60A, and in a case where it is determined that reimaging is necessary, the technician RG may press the second operation button 62 to perform reimaging.

The CPU 32 determines whether or not a reimaging instruction has been given by the technician RG pressing the second operation button 62 (step S12). In a case where it is determined that the reimaging instruction has been given (step S12: YES), the CPU 32 finishes the display of the image display region 60A (step S13), and returns the process to step S10.

In a case where it is determined that there is no reimaging instruction (step S12: NO), the CPU 32 determines whether or not an AI image determination instruction has been given by the technician RG pressing the first operation button 61 (step S14). In a case where the CPU 32 determines that the AI image determination instruction has been given (step S14: YES), the model selection unit 51 selects the trained model LM corresponding to the imaging techniques included in the imaging order 37 from among the plurality of trained models LM stored in the storage device 34 (step S15).

Next, the determination unit 52 performs the above determination process by using the trained model LM selected by the model selection unit 51 (step S16). Next, in a case where the determination unit 52 determines that reimaging is necessary, the corrective measure derivation unit 53 performs a corrective measure derivation process on the basis of the reason for reimaging (step S17). In a case where the determination unit 52 determines that reimaging is necessary, the presentation unit 54 displays a message including a warning, a reason for reimaging, and a corrective measure, and an enlarged image (refer to FIG. 9) in the image display region 60A (step S18). In a case where the determination unit 52 determines that the reimaging is unnecessary, the presentation unit 54 displays a message (refer to FIG. 10) indicating that the reimaging is unnecessary in the image display region 60A. The technician RG can accurately determine whether or not reimaging is necessary by checking the message or the like displayed in the image display region 60A.

After step S18, the CPU 32 returns the process to step S12. In step S12, the CPU 32 determines whether or a reimaging instruction has been given. In a case where the technician RG determines that reimaging is necessary on the basis of the message or the like displayed in the image display region 60A, the technician RG may perform reimaging by pressing the second operation button 62.

In a case where it is determined in step S14 that there is no AI image determination instruction (step S14: NO), the CPU 32 determines whether or not an image output instruction has been given by the technician RG pressing the third operation button 63 (step S19). In a case where the CPU 32 determines that there is no image output instruction (step S19: NO), the process returns to step S12. In a case where it is determined that the image output instruction has been given (step S19: YES), the CPU 32 outputs the X-ray image XP to the PACS or the like and finishes the process.

As described above, in the imaging support device according to the present embodiment, the necessity of and a reason for recapturing an acquired new X-ray image are determined by using a trained model that has learned a relationship between an X-ray image acquired in the past and the necessity of and a reason for reimaging. In a case where it is determined that reimaging is necessary, the imaging support device derives and presents a corrective measure for correcting a position or an orientation of a subject on the basis of the reason for reimaging. As described above, the imaging support device makes it possible to support positioning of a subject at the time of reimaging. Consequently, the positioning accuracy of the subject at the time of reimaging is improved, and the repetition of reimaging is suppressed. As a result, unnecessary exposure of the subject is reduced and the examination time is reduced.

Figure 12:
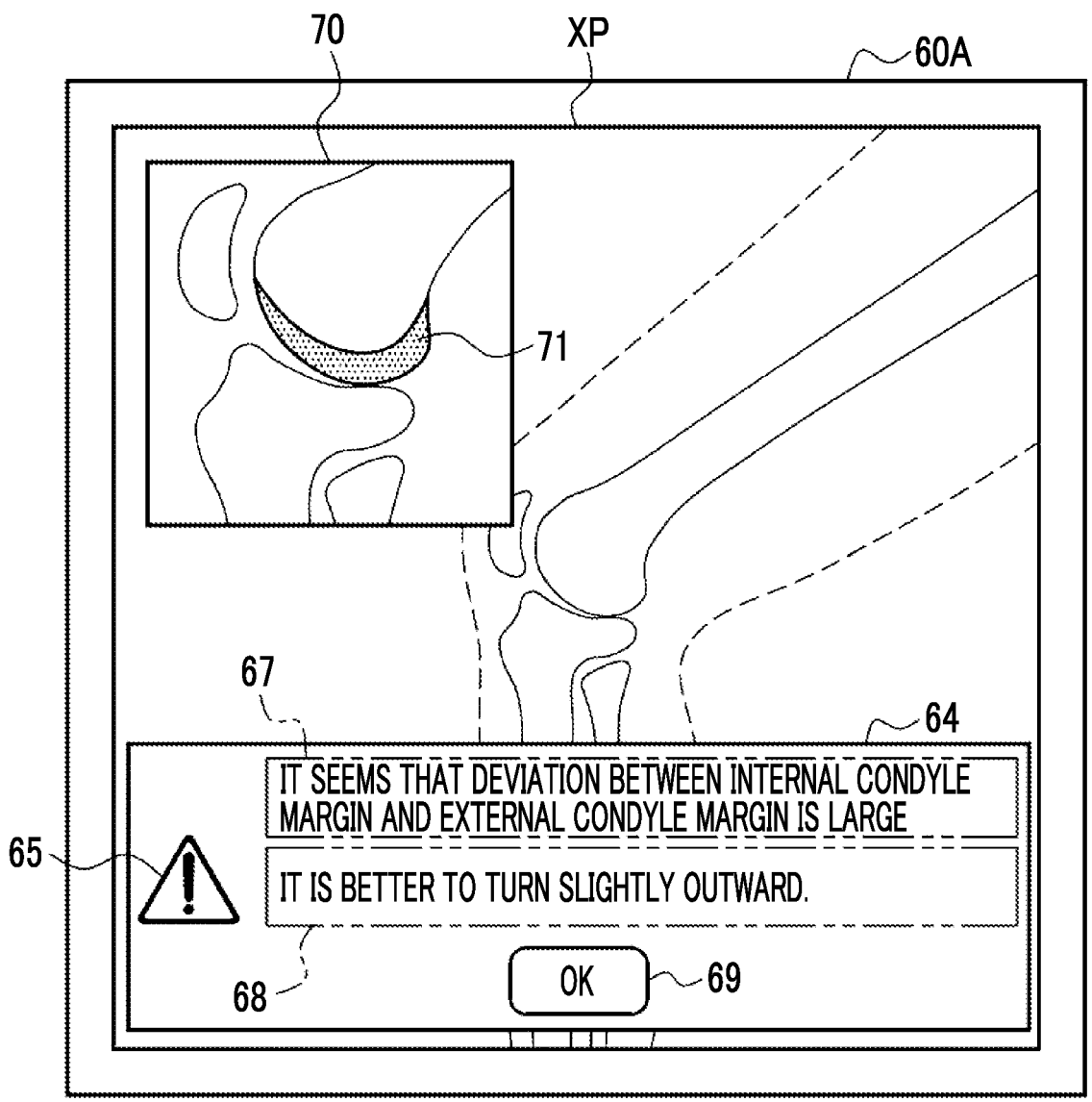
FIG. 12 is a diagram showing an example of displaying a pixel region contributed to determination of a reason for reimaging in an enlarged image.

In the above embodiment, the presentation unit 54 displays the enlarged image 70 of the region of interest ROI that the determination unit 52 pays attention to in the image display region 60A (refer to FIG. 9). As shown in FIG. 12, the presentation unit 54 may display a pixel region 71, which has contributed to the determination of the reason for reimaging by the determination unit 52, in the enlarged image 70. As a result, the technician RG can more accurately determine the necessity of reimaging.

In the above embodiment, the presentation unit 54 displays a reason for reimaging in the image display region 60A as an orientation (outward turning or inward turning) of an imaging site, but may display a more detailed reason for reimaging. For example, as shown in FIG. 12, "the deviation between the internal condyle margin and the external condyle margin is large" may be displayed as the reason for reimaging.

Figure 13:
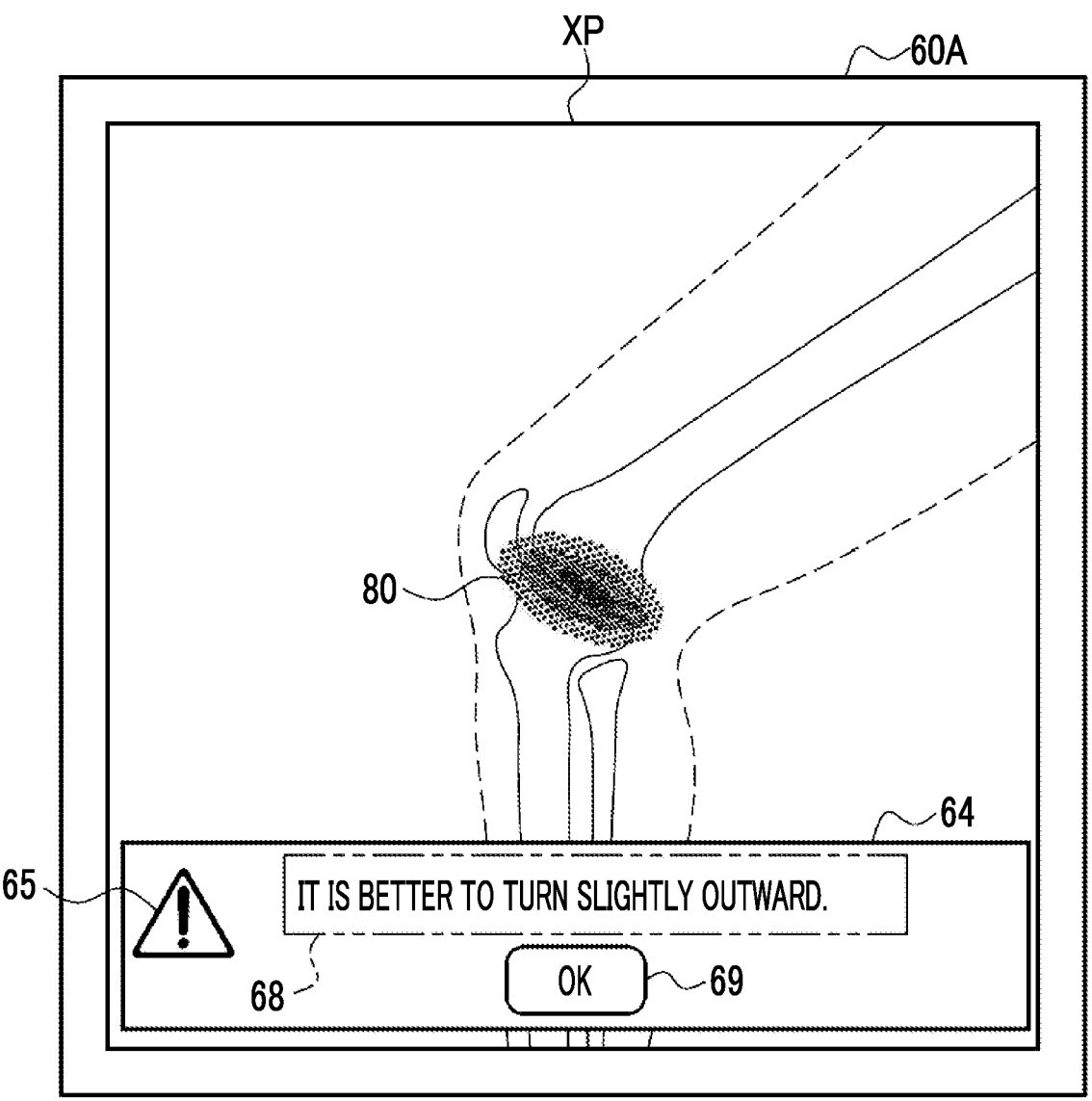
FIG. 13 is a diagram showing a display example of a console screen displaying a heat map as a reason for reimaging.

In the above embodiment, the reason for reimaging is displayed by text, but may be displayed by an image. For example, as shown in FIG. 13, a heat map 80 representing a location determined by the trained model LM as a feature location with respect to the X-ray image XP in the determination process is displayed in the image display region 60A. The heat map 80 shows a region that contributes to the determination of the reason for reimaging, similarly to the pixel region 71 (refer to FIG. 12). The heat map 80 shows that the higher the density, the higher the contribution to the determination of the reason for reimaging.

In addition to the heat map 80, the reason for reimaging may be displayed by text (for example, the reason for reimaging 67 shown in FIG. 12). The heat map 80 may be displayed in the enlarged image 70. In this case, the heat map 80 is displayed in a region corresponding to the pixel region 71.

In the above embodiment, the presentation unit 54 presents a corrective measure for correcting an orientation (outward turning or inward turning) of an imaging site, but, alternatively, a corrective measure for correcting a position of the imaging site may be presented. As described above, a corrective measure presented by the presentation unit 54 may be any corrective measure for correcting a position or an orientation of a subject.

In the above embodiment, the determination unit 52 executes the determination process in response to receiving an instruction for executing the determination process via the input device 31 that is an operation device, but may execute the determination process in response to the X-ray image XP being capturing through X-ray imaging.

In the above embodiment, machine learning for generating the trained model LM is performed on the trained model providing server 40 provided outside the console 14, but may be performed inside the console 14. For example, the console 14 generates a new trained model LM by performing machine learning on the basis of the X-ray image XP and a final determination result from the technician RG. In a case where reimaging is performed, it is preferable that the technician RG can input a determination result and a reason for reimaging in text or the like, and store the determination result and the reason for reimaging in association with the X-ray image XP. Consequently, learning can be performed each time X-ray imaging is performed, and the trained model LM can be updated.

In the above embodiment, in a case where the determination unit 52 determines that reimaging is necessary, the warning mark 65 is displayed to give a warning, but the warning is not limited to this and may be given by sound or the like. The warning may be given according to any method for stimulating the perception of the technician RG or the like.

Each of the above embodiments has been described by exemplifying the X-ray imaging system provided in the imaging room, but the X-ray imaging system may be one using a so-called mobile visiting car.

The technique of the present disclosure can be applied not only to X-rays but also to a system for imaging a subject by using other radiation such as γ-rays.

In each of the above embodiments, hardware structures of processing units executing various processes, such as the display control unit 50, the model selection unit 51, the determination unit 52, the corrective measure derivation unit 53, and the presentation unit 54 are various processors as described below.

The various processors include a CPU, a programmable logic device (PLD), a dedicated electric circuit, and the like. As is well known, the CPU is a general-purpose processor that executes software (program) and functions as various processing units. The PLD is a processor such as a field programmable gate array (FPGA) of which a circuit configuration can be changed after manufacturing. The dedicated electric circuit is a processor having a circuit configuration specially designed for executing a specific process, such as an application specific integrated circuit (ASIC).

One processing unit may be configured with one of these various processors, or may be configured with a combination of two or more processors of the same type or different types (for example, a plurality of FPGAs or a combination of a CPU and an FPGA). A plurality of processing units may be configured by one processor. As an example of configuring a plurality of processing units with one processor, first, there is a form in which one processor is configured by a combination of one or more CPUs and software, as typified by a computer used for a client or a server, and this processor functions as a plurality of processing units. Second, as typified by system on chip (SoC), there is a form in which a processor that realizes functions of the entire system including a plurality of processing units with one integrated circuit (IC) chip is used. As described above, the various processing units are configured by using one or more of the above various processors as a hardware structure.

The hardware structure of these various processors is, more specifically, an electric circuit (circuitry) in which circuit elements such as semiconductor elements are combined.

It goes without saying that the present invention is not limited to each of the above embodiments, and various configurations can be employed without departing from the concept of the present invention. The present invention is applied not only to a program but also to a storage medium storing the program in a non-transitory manner.

What is claimed is:

1. An imaging support device used in a radiography apparatus including a radiation source and a radiation image detector that detects a radiation image of a subject on the basis of radiation emitted from the radiation source and transmitted through the subject, the imaging support device comprising:
   at least one processor; and
   a memory storing a program,
   wherein the processor is configured, in accordance with the program, to execute:
   an image acquisition process of acquiring a radiation image from the radiography apparatus;
   a determination process of causing a neural network to determine whether reimaging of the acquired radiation image is required, and to identify a cause for requiring the reimaging, the cause being an orientation misalignment of the subject, the orientation misalignment including outward rotation or inward turning of the subject, by inputting the acquired radiation image as an input image into the neural network;
   a corrective measure derivation process of, in a case where the determination process indicates that reimaging is required, deriving a corrective measure for correcting the orientation misalignment of the subject by specifying a direction of turning based on the identified misalignment; and
   a presentation process of displaying the corrective measure derived in the corrective measure derivation process on a display,
   wherein the neural network has been trained using data representing a radiation image acquired in the past from the radiography apparatus and corresponding annotations indicating whether reimaging was required and, if reimaging was required, specifying the cause of the orientation misalignment, thereby enabling the neural network to learn a relationship between the radiation image and the requirement for reimaging along with the cause.

2. The imaging support device according to claim 1, wherein in the presentation process, the processor displays the cause for requiring the reimaging on the display in addition to the corrective measure.

3. The imaging support device according to claim 2, wherein the processor displays, on the display, a heat map, as the cause, representing a location determined by the neural network as a feature location in the radiation image.

4. The imaging support device according to claim 1, wherein in the presentation process, the processor enlarges and displays a target site of determination in the determination process on the display.

5. The imaging support device according to claim 1, wherein after a radiation image acquired through radiography is displayed on the display, the processor executes the determination process in a case where an instruction for executing the determination process is received via an operation device.

6. The imaging support device according to claim 1, wherein the processor gives a warning in a case where the determination process is performed on a radiation image obtained through radiography and it is determined that reimaging of the acquired radiation image is required.

7. The imaging support device according to claim 4, wherein the target site is a region of interest specified on the basis of a feature amount of the radiation image in the determination process, the feature amount being obtained by performing a convolution operation on the radiation image.

8. An operation method for an imaging support device used in a radiography apparatus including a radiation source and a radiation image detector that detects a radiation image of a subject on the basis of radiation emitted from the radiation source and transmitted through the subject, the operation method comprising:
an image acquisition step of acquiring a radiation image from the radiography apparatus;
a determination step of causing a neural network to determine whether reimaging of the acquired radiation image is required, and to identify a cause for requiring the reimaging, the cause being an orientation misalignment of the subject, the orientation misalignment including outward rotation or inward turning of the subject, by inputting the acquired radiation image as an input image into the neural network;
a corrective measure derivation step of, in a case where the determination step indicates that reimaging is required, deriving a corrective measure for correcting the orientation misalignment of the subject by specifying a direction of turning based on the identified misalignment; and
a presentation step of displaying the corrective measure derived in the corrective measure derivation step on a display,
wherein the neural network has been trained using data representing a radiation image acquired in the past from the radiography apparatus and corresponding annotations indicating whether reimaging was required and, if reimaging was required, specifying the cause of the orientation misalignment, thereby enabling the neural network to learn a relationship between the radiation image and the requirement for reimaging along with the cause.

9. A non-transitory computer-readable storage medium storing an operation program for operating an imaging support device used in a radiography apparatus including a radiation source and a radiation image detector that detects a radiation image of a subject on the basis of radiation emitted from the radiation source and transmitted through the subject and at least one processor, the operation program causing the processor to execute:
an image acquisition process of acquiring a radiation image from the radiography apparatus;
a determination process of causing a neural network to determine whether reimaging of the acquired radiation image is required, and to identify a cause for requiring the reimaging, the cause being an orientation misalignment of the subject, the orientation misalignment including outward rotation or inward turning of the subject, by inputting the acquired radiation image as an input image into the neural network;
a corrective measure derivation process of, in a case where the determination process indicates that reimaging is required, deriving a corrective measure for correcting the orientation misalignment of the subject by specifying a direction of turning based on the identified misalignment; and
a presentation process of displaying the corrective measure derived in the corrective measure derivation process on a display,
wherein the neural network has been trained using data representing a radiation image acquired in the past from the radiography apparatus and corresponding annotations indicating whether reimaging was required and, if reimaging was required, specifying the cause of the orientation misalignment, thereby enabling the neural network to learn a relationship between the radiation image and the requirement for reimaging along with the cause.

10. An imaging support device used in a radiography apparatus including a radiation source and a radiation image detector that detects a radiation image of a subject on the basis of radiation emitted from the radiation source and transmitted through the subject, the imaging support device comprising:
at least one processor; and
a memory storing a program,
wherein the processor is configured, in accordance with the program, to execute:
an image acquisition process of acquiring a radiation image from the radiography apparatus;
a determination process of causing a convolutional neural network to determine whether reimaging of the acquired radiation image is required, and to identify a cause for requiring the reimaging, the cause being an orientation misalignment of the subject, the orientation misalignment including outward rotation or inward turning of the subject, by inputting the acquired radiation image as an input image into the convolutional neural network, the convolutional neural network generating a feature map by performing a convolution operation on the input image, setting a specific region in the feature map as a region of interest based on a feature amount of each region in the feature map, and determining the requirement for reimaging along with the cause;
a corrective measure derivation process of, in a case where the determination process indicates that reimaging is required, deriving a corrective measure for correcting the orientation misalignment of the subject by specifying a direction of turning based on the identified misalignment; and
a presentation process of displaying the corrective measure derived in the corrective measure derivation process on a display,
wherein the neural network has been trained using data representing a radiation image acquired in the past from the radiography apparatus and corresponding annotations indicating whether reimaging was required and, if reimaging was required, specifying the cause of the orientation misalignment, thereby enabling the convolutional neural network to learn a relationship between the radiation image and the requirement for reimaging along with the cause.

* * * * *